Sept. 12, 1944.   C. JOHNSON   2,358,285
GAS ANALYZER
Filed Jan. 16, 1940   2 Sheets-Sheet 1
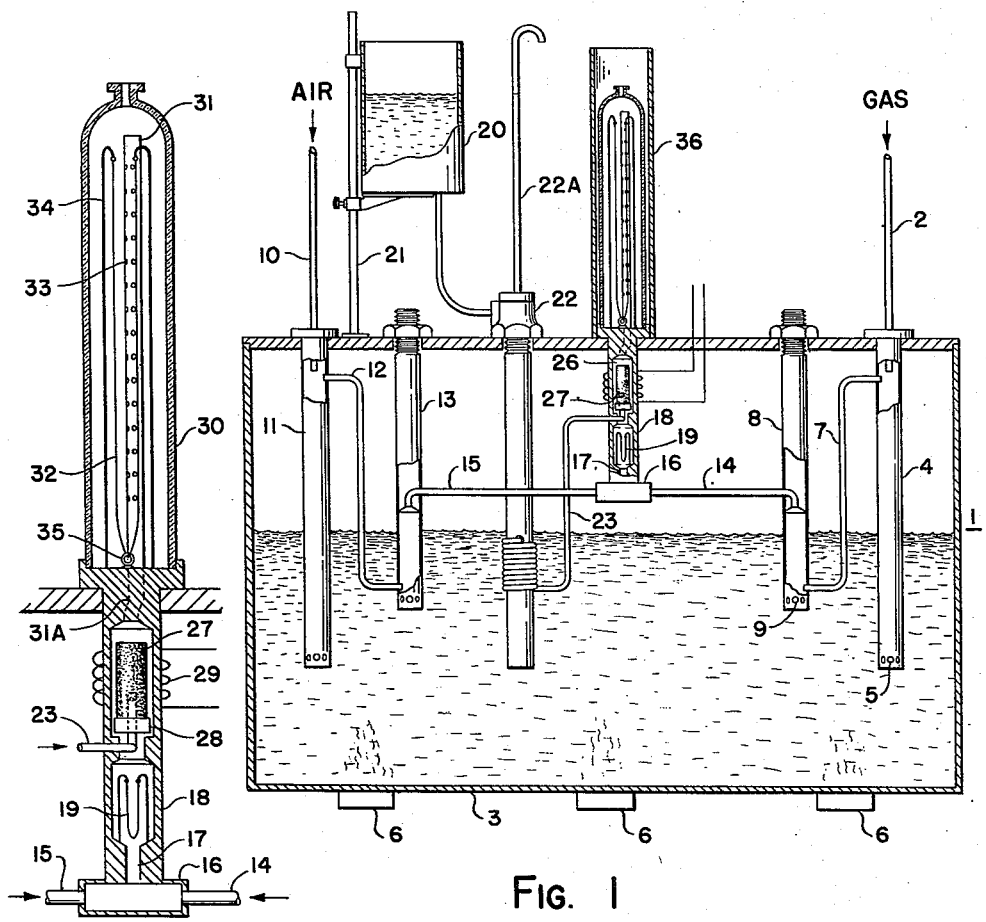
FIG. 1
FIG. 2
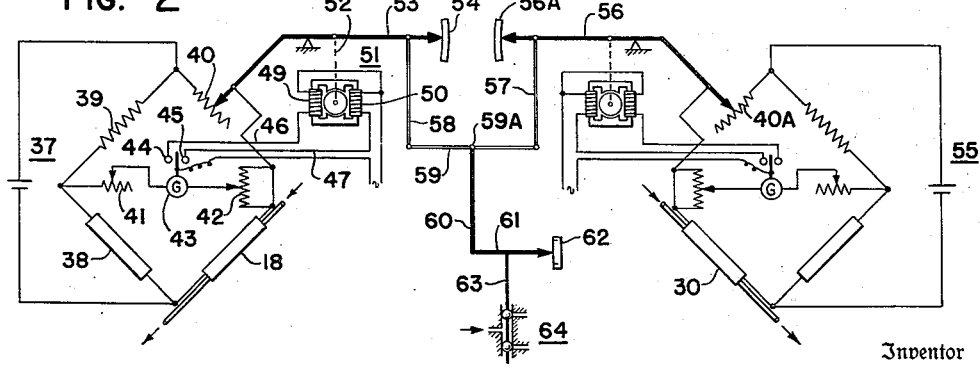
FIG. 3
Inventor
CLARENCE JOHNSON
By Raymond D. Junkins
Attorney Sept. 12, 1944. C. JOHNSON 2,358,285
GAS ANALYZER
Filed Jan. 16, 1940 2 Sheets-Sheet 2
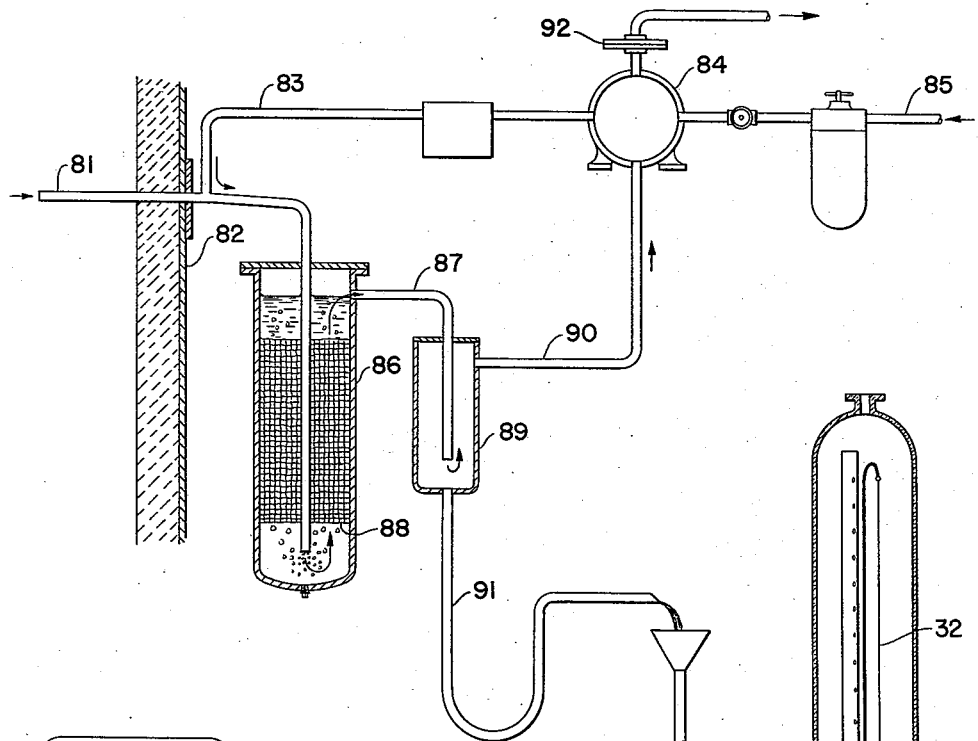
FIG. 5
FIG. 6
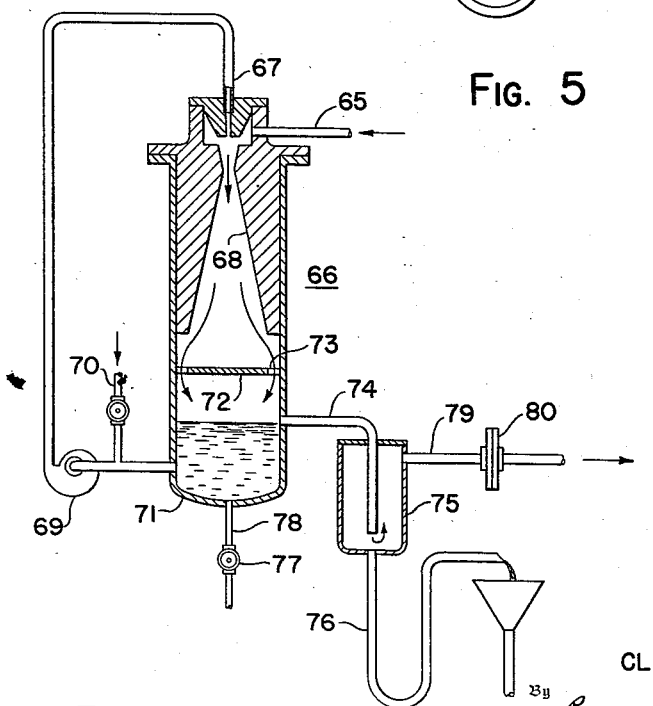
FIG. 4
Inventor
CLARENCE JOHNSON
By Raymond D. Junkins
Attorney Patented Sept. 12, 1944

2,358,285

UNITED STATES PATENT OFFICE 2,358,285

GAS ANALYZER

Clarence Johnson, Cleveland Heights, Ohio, assignor to Bailey Meter Company, a corporation of Delaware Application January 16, 1940, Serial No. 314,189

10 Claims. (Cl. 23—255)

This invention relates to gas analyzers, and more particularly to a gas analyzer that is capable of determining the composition of a gas or a gaseous mixture, and one that will determine, indicate and measure constituents of the gas or gaseous mixture by measuring the intensities of chemical reactions involving the constituents.

My invention serves a two-fold purpose in that it provides a single apparatus that will determine, measure and indicate the heating value of a gas, and determine, measure and indicate one or more constituents of a gaseous mixture.

A particular object of my apparatus is to analyze gaseous products of combustion for combustibles and excess air, continuously determining each singly and substantially simultaneously, and measuring, indicating and controlling therefrom.

It is another object of my invention to provide a sensitive and novel apparatus that will continuously determine and indicate the heating value of a gas or gaseous mixture.

These and other objects will be more apparent by referring to the drawings where:

Fig. 1 is a diagrammatic sectional elevation of my apparatus.

Fig. 2 is a detail of the combustible and oxygen determining means.

Fig. 3 represents the circuits embodied in my apparatus.

Figs. 4 and 5 represent two types of gas supplying means.

Fig. 6 is a modification of a part of Fig. 1.

My apparatus of Fig. 1 is suitable for many kinds of gas analysis. It is adaptable for analyzing flue gases of boiler furnaces or metallurgical furnaces where an extremely close control must be maintained of a certain desirable atmosphere, of space heaters, and exhaust gases of internal combustion engines. Considering then a furnace where it is desirable to know substantially simultaneously the varied gas content of the flue gas being exhausted therefrom, a continuous sample is withdrawn from a representative source (not shown) in the furnace and brought into the apparatus 1 by means of pipe 2.

The apparatus of Fig. 1 consists of a tank 3 partially filled with a liquid, as dibutyl-phthalate having a low vapor pressure, for purposes of maintaining a predetermined temperature within said tank and further for determining the heads of sample gases. The tank 3 is heated by heaters 6 and to which may be attached a thermal switch (not shown) sensitive to the temperature of the liquid in the tank.

The continuous sample of gas is forced through pipe 2 into cylinder 4 which extends into the liquid of tank 3 and has a plurality of orifices 5 at its base for the escape of any excess gas. The escaping gas bubbles upwardly and flows out through the loose fittings of the various cylinders or through holes that may be provided for it. From cylinder 4 the gas will continue through pipe 7 to a similar cylinder 8 having a closed top and entering near its base. Orifices 9 at the base again allow any excess gas to escape therefrom. This cylinder is provided with a threaded upper portion for purposes of final pressure head adjustment. Thus these cylinders 4 and 8 desirably determine the final pressure of the gas flowing into the detector chambers; the initial pressure being great enough to overcome the combined static head of the liquid on the submerged portions of the cylinders plus that necessary to force the gas through the detecting chambers.

I have found it to be desirable to arrange my analyzer so that gases would first be tested for combustible and then for oxygen content. In gases containing combustibles there is a deficiency of air. I therefore provide a predetermined quantity of such air constantly, for any expected amount of combustible. The air thus brought in (supplying means not shown) is treated similarly as the gas sample and flows through a similar pressure limiting means. It comes in on the opposite side of apparatus 1 through pipe 10 into cylinder 11 thence flows through pipe 12 into cylinder 13. I have made cylinders 8 and 13 substantially similar in construction and the gas and air coming therefrom are in predetermined amount and pressure and temperature. By means of conduits 14 and 15 leading from 8 and 13 I permit desirable amounts of air and gas to pass into a mixing chamber 16 where occurs a thorough inter-mixing.

Above the mixing chamber and connected directly to it through a narrow passage 17 is the combustible determining chamber 18. In this chamber is suspended a detector wire 19, as platinum, and which is continually electrically preheated to a certain temperature. Thus any predetermined mixture of gas and air upon entering this chamber will come into contact with the heated detector and if any combustible is present burning will occur. The detector member 19 serves as a leg of a Wheatstone bridge circuit, which circuit is shown in Fig. 3 and which will be hereinafter explained, and any change in its resistance because of a catalytic burning on its surface will be indicative of the combustible content of the burned gases.

Now, gases having an excess air content are generally low in combustibles, if they contain any at all. Thus to continually determine excess air or oxygen it is necessary to add to the gas analyzed a predetermined quantity of a fuel. The fuel added will combine with the free oxygen, and a measure of such reaction will serve as an indication of the oxygen content. I add then, to the stream of gas from which all combustible has been deleted, a fuel vapor such as vaporized methanol, cause a reaction of the new mixture, measure it, deduct from such measure the possible initially added unburned air and get a resultant reading of the oxygen content of the gas sample. It must be clearly understood however that the determination of both combustibles and oxygen is made from the same gas sample. I do not divide my gas sample into two streams and test each portion. I perform my two analyses upon the same stream continuously. Thus I obtain complete and immediate information as to the quality of the test sample at all times, information that is truly representative of an instantaneous condition.

As stated, a fuel gas or vapor must be added to the gas sample to have it combine with the free oxygen to determine its content. I have found methanol desirable although other fuels in the same class may be used. I show in Fig. 1 a supply tank 20 containing a liquid fuel which will be later vaporized and added to the gas sample. The tank is mounted on an adjustable support 21 which enables an adjustment of it and the flow of the liquid. The liquid then flows into a cylinder 22, a section of which is submerged in the liquid of tank 3 of apparatus 1. Cylinder 22 primarily serves the purpose of freeing all entrained air from the liquid fuel and which air would later give an erroneous oxygen reading. I effect this release of air by bringing the liquid to a temperature just below its boiling point. The free air escapes from the cylinder through pipe 22A. I style this cylinder as a "deaerator." The liquid fed to the vaporizing chamber of apparatus 1 is therefor entirely free of entrained air.

From the deaerator liquid fuel is conducted to a vaporizing chamber 26 by means of a certain length of capillary 23 tapping the cylinder at a predetermined point, then wound around it for several turns before terminating in the vaporizing chamber. Thus while the resistance of the capillary tubing is fixed, the flow of liquid fuel can be varied by vertically positioning the liquid tank 20. And the amount of liquid fuel fed to the vaporizer is at all times great enough to provide fuel vapor to combine with any amount of free oxygen in the gases tested.

The vaporizing chamber 26 to which capillary 23 leads has a stone vaporizer 27. The vaporizer (see Fig. 2) is of porous stone held in a cupped base 28 which has emerging through its center a portion of the capillary 23 extending sufficiently into the base of the stone vaporizer to serve as an additional holder therefor. That portion of the capillary in the stone vaporizer may have an orifice in its side, or more if necessary, in addition to the top opening to more widely distribute the liquid fuel to the vaporizer. The stone has the inherent ability in becoming thoroughly saturated with the liquid fuel constantly and immediately, presenting its entire surface to a certain depth for vaporization. Furthermore it never needs replacement, and is very easily cleaned upon occlusion with foreign matter. The vaporizer substantially fills its chamber 26 causing the test gas to envelop it in its upward travel, picking up fuel vapor.

I do not depend merely upon the passage of gas about the vaporizer to carry off the necessary amount of vapor fuel, for I have found that not enough at times is thereby evaporated. I therefore provide a positive means of vapor fuel generation by heating the vaporizing chamber to a certain temperature as shown by the resistance 29 wound around it. I thus make certain of a definite generated amount of vapor fuel at all times, avoiding the uncertainties of ordinary evaporation. Furthermore, since it is not feasible to evaporate a quantity of vapor fuel in proportion to a varying free oxygen content I vaporize a constant maximum value although but a portion of it may be at any one time utilized. And I do not need to change my fuel or alter it for any value of excess air.

The gaseous mixture flowing upwardly from chamber 18, where the original combustible in the gas stream has been deleted, surrounds the vaporizer and fills the chamber thoroughly intermixing with the generated fuel vapor. The new mixture continues upwardly through conduit 31A into a tube 31, which tube spreads the mixture on an adjacent catalyst 32. Distribution of the mixture is carefully effected through a plurality of evenly spaced apertures 33 in tube 31 facing the vertically suspended catalyst. The catalyst as shown is hung freely from supports 34, its bottom end going through a small fixed circle or cylinder 35 preventing it from swaying and changing its position due to a tilting of the entire device or perhaps the velocity of the gaseous mixture from the distributing tube. I further prevent any longitudinal warping of the catalyst, as shown in Fig. 6, by having it pass through the top of a small light weight ceramic cylinder 35A freely suspended thereon and floating in a recess 35B adapted to receive it.

The new mixture, upon striking the catalyst 32, is burned, the reaction occurring between the added fuel and the excess air in the gas sample, and any difference in temperature, when measured, will be representative of oxygen content. Thus I have described two independent yet substantially simultaneous gas constituent determinations of the same gas sample.

In the once through gas conducting construction of Fig. 2 I show catalyst 32 confined by a cylinder 30. This cylinder may be of any good heat resisting material. If it is desirable to note the occurrence of a reaction therein the cylinder may be of Pyrex glass. To further insulate against loss of heat I have found that a polished aluminum tube 36 of Fig. 1 is effective in preventing heat radiation.

While I have effected two separate reactions, one for combustible and the other for oxygen, the latter determination is not exactly a true one for the initially added air must be compensated for. Where a sizable quantity is added to the gas sample it will not all combine with the combustible and a portion of that amount will be included in the oxygen reading. Regardless, however, of the small amount of combustible that may be found and therefore a desire to diminish the added air, I have found it a good policy to maintain a definite amount of air over and above that to be utilized in the burning with a combustible to prevent reducing atmospheres about both the combustible detector and the oxygen determining catalyst, for such atmospheres will greatly alter the resistances thereof and give erroneous readings.

I effect the compensation of the added air by a particular interconnection of the two Wheatstone bridges embodied in my apparatus and shown in detail in Fig. 3. In this representative example the combustion chamber 18 through which the sample gas first flows and as indicated by arrows holds detector 19 which forms a resistance of bridge 37. The bridge consists of, further, the comparison or constant leg of the circuit as customarily shown at 38, a fixed resistance 39, the adjustable or balancing resistance 40 having a source of potential. Resistances 41 and 42 are inserted for calibration purposes. In operation, a burning in chamber 18 will cause a change in resistance of the detector member, therein deflecting the conjugate positioned galvanometer 43, causing it to make contact with either terminal 44 or 45 to which are attached conductors 46, 47 leading to opposed fields 49, 50 of a reversible motor 51. Energization of either field winding will cause the motor to rotate in a dictated direction an amount equivalent to the time duration of the galvanometer deflection against the particular contact. The motor 51 is attached through a gearing device 52 (diagrammatically shown by a dash line) to an index arm 53 whose other end moves along resistance 40 of the bridge, rebalancing the bridge. Upon a rebalance the galvanometer needle will again assume its neutral position. The index arm will move relative index 54 indicating the combustible content.

A similar bridge circuit 55 contains catalyst 32 enclosed in the oxygen determining chamber 30, and its associated rebalancing means. Thus a change in resistance of catalyst 32 will simultaneously rebalance bridge 55 and indicate oxygen content by movement of index arm 56 relative an adjustable resistance 40A and index 56A.

As stated hereinbefore a part of the total initially added air must be deducted from the oxygen reading or in some way compensated for. I effect this correction by means of interconnecting linkage of the two index arms 53 and 56. I have pivotally suspended to index arm 56 a link 57 while to index arm 53 a link 58. Joining links 57 and 58 is a horizontal link 59. Now since a definite amount of CO, that is combustible, combines with a definite amount of air, index 54 may be made to read in oxygen and CO. The motion of index arm 53 may be said to represent the quantity of each. It may indicate the CO value on the index alone, yet in motion represent the oxygen content. Since horizontal link 59 is positioned by two oxygen values, it at some point as at 59A, represents the true value; that is, point 59A at all times represents an algebraic summarization of the two values of oxygen. And link 60 attached to such point by actuating an index arm 61 relative an index 62 will at all times indicate the true oxygen content in the test sample.

I further show in connection with Fig. 3 a pilot valve 64 of the type described in my Patent No. 2,054,464. This valve upon actuation by link 63, pivotally connected to the oxygen index arm 61, is adapted to relay a proportionate fluid pressure to a regulating apparatus (not shown) manipulating a damper or a fuel supplying means as may be desirable.

It is also apparent from my Fig. 1 that the apparatus may be used individually as for combustible determination or oxygen. All that is necessary to make it so is to merely not use one or the other of the bridge circuits. And a still further adaptation is its use as a B. t. u. indicator of combustible gases. In the latter instance only the combustion chamber 18 need be used and bridge circuit 37. A predetermined amount of air is brought in and mixed with the gas, the varying heat given off is reflected in the detector's resistance and serves as a measure of the B. t. u. value of the gas tested. A still further use is that of indicating certain desirable atmospheres in certain furnaces, as reducing or oxidizing atmospheres. In such instances a single constituent determination may not be necessary. While a reducing atmosphere will always indicate an excess of combustible and a lack of oxygen; an oxidizing atmosphere will indicate otherwise, and a swing one from the other will be immediately reflected in either bridge. Such a general indication of a swing of one atmosphere to another may prove sufficient. In this instance the summarizing linkage joining both bridges may be dispensed with.

In the use of my analyzer it is of primary importance that gases to be analyzed in my apparatus be free from substances that may be injurious to the vital working parts, as to detectors and catalysts, and that such gases be fed in a constant, unvarying stream. Gases which tend to occlude or poison catalysts and detectors greatly shorten their utility, necessitating frequent replacements. I have therefor devised a means for my apparatus of securing a proper sample of gas. I use the aspirating method of Fig. 4 for securing a continuous and proper gas sample to my analyzer where the exhaust gases are nearly entirely devoid of poisonous gases as sulphurous compounds and suspended solid matter. Such gases issue usually from gas and oil fired furnaces. Then, tapping such furnace at a representative point (not shown) the sample is sucked through pipe 65 of aspirator 66 by means of the aspirating effect of a stream of water issuing from a nozzle 67 into a diverging cone 68. A pump 69 having a supply source 70 and the reservoir 71 furnishes the water at a desired pressure. This mixture of gas and water is then forced through numerous circumferential orifices 73 of a baffle plate 72 in the flow path of the mixture and substantially at the foot of the aspirator cone 68. The level of reservoir 71 is determined by an overflow pipe 74 which leads into a gas tight cylinder 75. The overflow will also carry out any floating material rising to the surface of the reservoir whence it flows to waste through 75 and U-shaped pipe 76. Reservoir 71 can be occasionally cleaned by means of valve 77 in pipe 78. The gas brought in by the water is forced through pipe 74 into cylinder 75 where its flow is reversed, causing it to further yield any entrained liquid it may have, then from cylinder 75 it flows out through pipe 79 through a final felt filter 80 to my analyzer. A particular advantage of this recirculating aspirating type of gas supplying means is the small amount of additional fresh water that is needed for its operation. The main source is the accumulation of reservoir 71, and this supply is used over repeatedly.

In Fig. 5 I show a supplying means adapted for use where gases carry sulphurous mixtures and a good deal of ash. The gas sampling pipe 81 extends from out a furnace wall 82 tapping a representative location for flue gases. A pipe 83 meets 81 outside the furnace wall in a T connection, and water flowing through pipe 83 under a certain pressure given it by a liquid operating vacuum pump 84 commercially known as a "Hytor" pump, and obtaining its water supply from an indicated source 85, carries the flue gas into a washing and scrubbing cylinder 86. Cylinder 86 is filled with water at all times, the depth determined by an overflow pipe 87. Substantially filling the cylinder is a finely meshed screen 88 of a metallic material for taking out any corrosive gases and solid matter. The pipe 81 descends into the cylinder 86 below the screen and to a short distance from its base, causing the gas to reverse its flow and to bubble upwardly to the upper portion thereof where it is collected and forced out. The gas is then sucked through pipe 87 into the overflow chamber 89 where it is again reversed and taken in through pipe 90, the pump 84 through a felt filter 92 and into the apparatus of Fig. 1. The overflow, containing residue, is continually carried off by waste pipe 91.

Thus while I have disclosed an apparatus capable of performing a multiplicity of functions, I further realize that it is susceptible of many modifications, and I therefore wish not to be limited by my disclosure but by the attached claims in view of prior art.

Certain portions of my invention disclosed but not claimed herein are disclosed and claimed in my copending divisional application Serial No. 548,106.

What I claim as new, and desire to secure by Letters Patent of the United States, is:

1. In a continuous gas analyzer, in combination, a tank adapted to contain an inert liquid, means associated with said tank to maintain said liquid at a constant temperature, a pair of pressure and temperature equalizing devices immersed in said liquid and open to the same, a mixing chamber and means connecting it to both said devices, conduit means connected respectively to said devices and adapted to supply gas to be analyzed, and air, both under pressure, each to one of said devices, means in said chamber to continuously burn any fuel in the mixture of air and gas formed therein, a second chamber connected to receive the discharge from the first, conduit means in heat exchange relationship with the liquid in said tank and connected to the second chamber to supply thereto a volatile liquid fuel at constant temperature, means in said second chamber to vaporize said fuel always in sufficient quantity to combine with all free oxygen left in the mixture delivered from the mixing chamber, a detector chamber connected to the second chamber to receive the gas from the second chamber and a catalytic detector therein sensitive to the total oxygen in the gas stream.

2. In a continuous gas analyzer, in combination, a tank adapted to contain an inert liquid, means associated with said tank to maintain said liquid at a constant temperature, a pair of pressure and temperature equalizing devices, immersed in said liquid and open to the same, a mixing chamber and means connecting it to both said devices, conduit means connected respectively to said devices and adapted to supply gas to be analyzed, and air, both under pressure, each to one of said devices, means in said chamber to continuously burn any fuel in the mixture of air and gas formed therein, a second chamber connected to receive the discharge from the first, conduit means connected to said second chamber to supply a volatile liquid fuel thereto, means in said second chamber to vaporize said fuel always in sufficient quantity to combine with all free oxygen left in the mixture delivered from the mixing chamber, a detector chamber connected to the second chamber to receive the gas from the second chamber and a catalytic detector therein sensitive to the total oxygen in the gas stream.

3. In a continuous gas analyzer, in combination, a pair of pressure and temperature equalizing devices, a mixing chamber and means connecting it to both said devices, conduit means connected respectively to said devices and adapted to supply gas to be analyzed, and air, both under pressure, each to one of said devices, means associated with said chamber to continuously burn any fuel in the mixture of air and gas formed therein, said means comprising a catalytic detector continuously sensitive to the presence of combustible in the mixture, a second chamber connected to receive the discharge from the first, conduit means connected to said second chamber to supply a volatile liquid fuel thereto, means in said second chamber to vaporize said fuel always in sufficient quantity to combine with all free oxygen left in the mixture delivered from the mixing chamber, a detector chamber connected to the second chamber to receive the gas from the second chamber and a catalytic detector therein sensitive to the total oxygen in the gas stream.

4. In a continuous gas analyzer, in combination, a tank adapted to be partially filled with an inert liquid, means associated with said tank to maintain said liquid at a constant temperature, a pair of pressure and temperature equalizing devices, immersed in and functioning with the help of said liquid, a mixing chamber and means connecting it to both said devices, conduit means connected respectively to said devices and adapted to supply gas to be analyzed, and air, both under pressure, each to one of said devices, means comprising a heated wire associated with said chamber to continuously burn any fuel in the mixture of air and gas formed therein, a second chamber connected to receive the discharge from the first, conduit means connected to said second chamber to deliver thereto a gaseous fuel always in sufficient quantity to combine by combustion with all free oxygen left in the mixture delivered from the mixing chamber, a detector chamber connected to the second chamber to receive the gas from the second chamber, a catalytic detector therein sensitive to the total oxygen in the gas stream and means responsive to changes in the manifestations of the said detector.

5. In a continuous gas analyzer, in combination, a pair of pressure and temperature equalizing devices, a mixing chamber and means connecting it to both said devices, conduit means connected respectively to said devices and adapted to supply gas to be analyzed, and air, both under pressure, each to one of said devices, means associated with said chamber to continuously burn any fuel in the mixture of air and gas formed therein, said means comprising a catalytic detector continuously sensitive to the presence of combustible in the mixture, a second chamber connected to receive the discharge from the first, conduit means connected to said second chamber to supply a volatile liquid fuel thereto, means in said second chamber to vaporize said fuel always in sufficient quantity to combine with all free oxygen left in the mixture delivered from the mixing chamber, a detector chamber connected to the second chamber to receive the gas from the second chamber, a catalytic detector therein sensitive to the total oxygen in the gas stream, means responsive to changes in the manifestations of the catalytic detectors and electric circuits connecting said last mentioned means and the detectors.

6. In a gas analyzer, in combination, the apparatus of claim 5, and means for continuously indicating individually and algebraically adding the manifestations of the means responsive to changes in said detectors.

7. In a continuous gas analyzer, in combination, a mixing chamber, conduit means connected to said chamber and adapted to supply regulated quantities of gas to be analyzed, and air, both under pressure, to said chamber, means associated with said chamber to continuously burn any fuel in the mixture of air and gas formed therein, said means comprising a catalytic heated wire detector, a second chamber connected to receive the discharge from the first, conduit means connected to said second chamber to supply thereto a gaseous fuel always in sufficient quantity to combine by combustion with all free oxygen left in the mixture delivered from the mixing chamber, a detector chamber connected to the second chamber to receive the gas from the second chamber and a catalytic heated wire detector therein, and means to individually and continuously measure and indicate the change in heat of each detector wire caused by the combustion occurring thereat.

8. In a gas analyzer as claimed in claim 7, means to combine the said indications to depict the true oxygen content of the original gas.

9. In a continuous gas analyzer, in combination, a pair of pressure and flow regulating devices, a mixing chamber and means connecting it to both said devices, conduit means connected respectively to said devices and adapted to supply gas to be analyzed, and air, both under pressure, each to one of said devices, means in said chamber to continuously burn any combustible in the mixture of air and gas formed therein, a second chamber connected to receive the discharge from the first, conduit means connected to the second chamber to supply a volatile liquid fuel thereto, means in said second chamber to vaporize said fuel always in sufficient quantity to combine with all free oxygen left in the mixture delivered from the first mixing chamber, a detector chamber connected to the second chamber to receive the gas from the second chamber and a catalytic detector therein sensitive to the total oxygen in the gas stream.

10. A continuous gas analyzer, in combination, a pair of pressure and flow regulating devices, a mixing chamber and means connecting it to both said devices, conduit means connected respectively to said devices and adapted to supply gas to be analyzed, and air, both under pressure, each to one of said devices, means associated with said chamber to continuously burn any combustible in the mixture of air and gas formed in the mixing chamber, a second chamber connected to said mixing chamber to receive the remainder of said mixture therefrom, means associated with said second chamber to deliver thereto a gaseous fuel always in sufficient quantity to combine by combustion with all free oxygen left in the remainder of the mixture, a detector chamber connected to the second chamber to receive the gas and fuel mixture therefrom and a catalytic detector therein sensitive to the total oxygen in the gas stream.

CLARENCE JOHNSON.